United States Patent
Yanagi et al.

(10) Patent No.: US 6,820,153 B2
(45) Date of Patent: Nov. 16, 2004

(54) INTERRUPT PROCESSING AND MEMORY MANAGEMENT METHOD IN AN OPERATION PROCESSING DEVICE AND A DEVICE USING THE SAME

(75) Inventors: Hiroyuki Yanagi, Kyoto-fu (JP); Yosuke Baba, Kyoto-fu (JP); Yasuhiro Nishimura, Kyoto-fu (JP); Motoyuki Kato, Kyoto-fu (JP); Shiji Nakagawa, Kyoto-fu (JP)

(73) Assignee: Omron Corporation, Kyoto-fu (JP)

( * ) Notice: Subject to any disclaimer, the term of this patent is extended or adjusted under 35 U.S.C. 154(b) by 253 days.

(21) Appl. No.: 09/801,899

(22) Filed: Mar. 9, 2001

(65) Prior Publication Data

US 2001/0037425 A1 Nov. 1, 2001

(30) Foreign Application Priority Data

Mar. 9, 2000 (JP) ........................................ H12-064371

(51) Int. Cl.⁷ ............................................. G06F 13/24
(52) U.S. Cl. ........................ 710/260; 710/267; 710/268; 710/26 R
(58) Field of Search ................................. 710/260–264, 710/267–269

(56) References Cited

U.S. PATENT DOCUMENTS

| | | | | | |
|---|---|---|---|---|---|
| 4,296,470 A | * | 10/1981 | Fairchild et al. | ............ | 710/269 |
| 5,459,872 A | * | 10/1995 | Connell et al. | ............. | 710/263 |
| 5,701,493 A | * | 12/1997 | Jaggar | ......................... | 710/261 |
| 6,044,430 A | * | 3/2000 | MacDonald | ................. | 710/260 |
| 6,223,246 B1 | * | 4/2001 | Miyamoto | ................... | 710/261 |
| 6,243,804 B1 | * | 6/2001 | Cheng | ......................... | 712/228 |
| 6,370,606 B1 | * | 4/2002 | Bonola | ........................ | 710/260 |
| 6,480,919 B2 | * | 11/2002 | Bonola | ........................ | 710/262 |
| 6,493,781 B1 | * | 12/2002 | Saville et al. | ............... | 710/260 |
| 6,539,447 B1 | * | 3/2003 | Sawada | ....................... | 710/260 |
| 6,539,448 B1 | * | 3/2003 | Deng | .......................... | 710/260 |
| 6,581,119 B1 | * | 6/2003 | Maeda et al. | ............... | 710/260 |
| 6,634,023 B1 | * | 10/2003 | Komatsu et al. | ............ | 717/159 |
| 6,675,191 B1 | * | 1/2004 | Ito | .............................. | 718/102 |

* cited by examiner

*Primary Examiner*—Tim Vo
*Assistant Examiner*—Raymond N Phan
(74) *Attorney, Agent, or Firm*—Dickstein Shapiro Morin & Oshinsky LLP (57) ABSTRACT

In operation processing devices based on Java (a registered trademark), each time a functional program is executed, in response to a command to access that function, a work area for the program which is accessed is set up dynamically within the thread work area for the thread then being executed. By applying this processing in the case of an external interrupt as well, this invention eliminates the need to maintain a separate memory area for interrupt program processing. It simplifies the processing involved in sidetracking and restoring data and switching the program to be executed. The work area for a program being run is a dynamically created memory area according to this invention. When an interrupt is generated, the register data indicating the status and register state of the program being run at that time are sidetracked in the work area for that program.

2 Claims, 9 Drawing Sheets

INTERRUPT PROCESSING AND MEMORY MANAGEMENT METHOD IN AN OPERATION PROCESSING DEVICE AND A DEVICE USING THE SAME

FIELD OF THE INVENTION

This invention concerns a program switching or thread interrupt processing method in an operation processing device and the device using such interrupt processing method, which causes a specific program being executed to be temporarily halted in response to an interrupt so that another program can be executed. More specifically, the invention concerns interrupt processing in an operation processing device which can create a memory work area dynamically depending on the program content being currently processed.

BACKGROUND OF THE INVENTION

Recent operation processing devices which execute multithread processes set up a separate work area or memory location (hereafter, these areas are referred to as "thread work areas") for each thread. When a thread being executed needs to access programs, it accumulates work areas, which are called "frames," in the thread work area. It executes these programs in order, starting with the one most recently accessed.

When this type of operation processing device receives an interrupt signal, it has to interrupt the program being executed in order to run some other program. To do this it must set up an area (hereafter referred to as the "storage area for sidetracked data") to sidetrack the register state and progress of the program being executed at the moment the interrupt was generated. Since a number of interrupts may be generated in series, a stack data container or area is designated where the sidetracked data for each interrupt can be stored in the order received.

Figure 6:
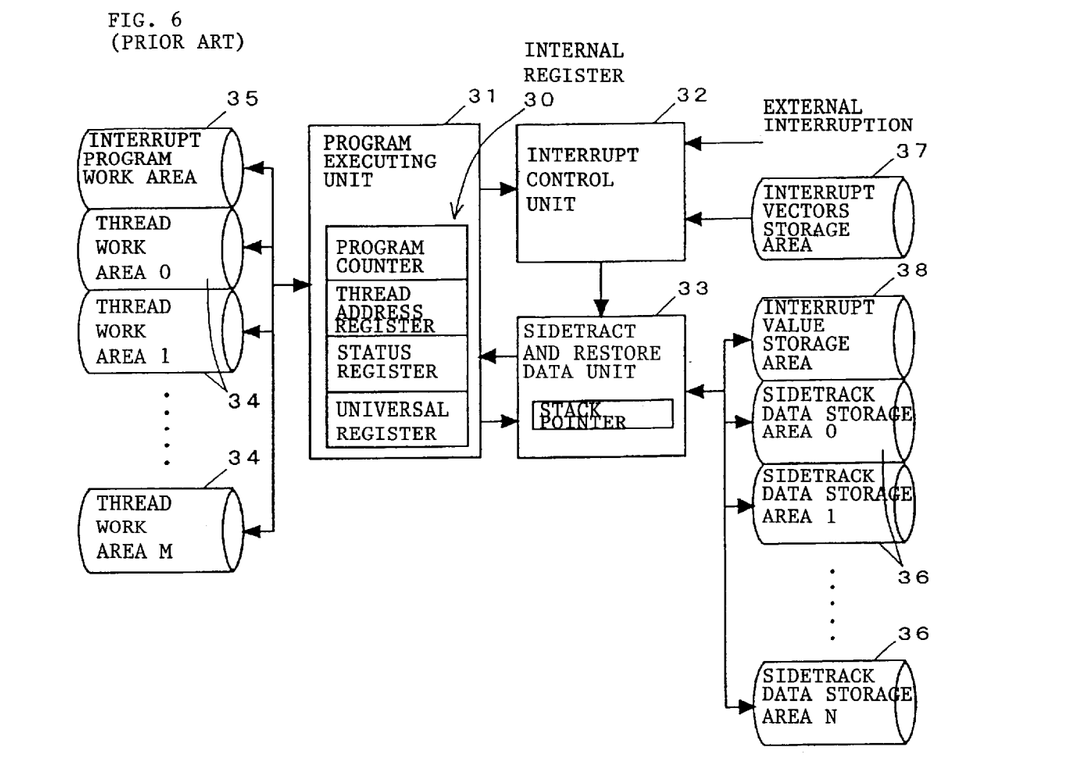
FIG. 6 shows a prior art configuration for this sort of operation processing device.

FIG. 6 shows a prior art configuration for this sort of operation processing device.

In the figure, program executing unit 31 to execute the program, interrupt control unit 32 to control interrupts and side track and restore data unit 33 to sidetrack and restore data are all realized by the functions of a processor (i.e., a CPU), which is not pictured. Thread work area 34, interrupt program work area 35 and sidetrack data storage area 36 for sidetracked data are all set up in a RAM. Interrupt vector storage area 37 for interrupt vectors and storage area 38 for values to generate interrupts (hereafter referred to simply as "interrupt value storage area 38") are set up in either a ROM or a RAM.

Program executing unit 31 has an internal register 30, in which are stored the data it needs to run a program. As it executes a program, it reads and writes data to and from internal register 30 and the thread work area 34 for the thread it is executing. The aforesaid internal register 30 contains a program counter, which is the register to store addresses needed to run the program; a thread address register, which stores the address of the thread work area 34 for the thread being used; a status register, which stores data indicating the internal status of the processor; and a universal register, which stores the results of the operations.

Interrupt control unit 32 receives an interrupt signal and determines whether the interrupt program requesting processing demanded by that signal should be given priority over the currently running program. If it determines that the interrupt program should be given priority, it activates sidetrack and restore data unit 33.

Sidetrack and restore data unit 33 temporarily sidetracks the values in internal register 30 (hereafter, the "register data") at the moment the interrupt was generated. When the interrupt program's processing is completed, it returns the aforesaid sidetracked register data to internal register 30 and restores the operating status or register state of the halted program. Sidetrack and restore data unit 33 has inside it a stack pointer to indicate which data is at the head of the stack.

Figure 7:
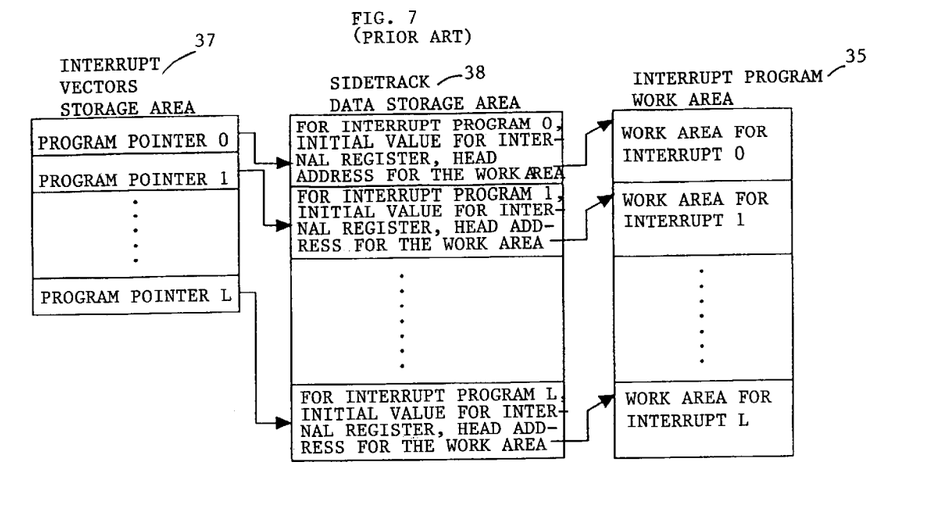
FIG. 7 shows the configuration of the data in the memory of the operation processing device in FIG. 6 which is a prior art.

FIG. 7 shows the configuration of the data in the memory of the operation processing device in the aforesaid FIG. 6 which is a prior art.

A thread work area 34 is set up for each thread that is activated (in the example, there are M number of work areas). A thread work area 34 is set up for each program started up to access a function and the likes, in the order in which they are accessed. As their programs are completed, these program work areas disappear, and in their locations, new work areas are set up as new programs are accessed.

The number of areas which are set up in sidetrack data storage area 36 (in the example, N number of areas) should be equal to the number of interrupts anticipated. A number of work areas (in the example, L number of work areas) are set up in interrupt program work area 35 for interrupt programs, which is divided into segments according to the number of interrupt programs. If the same interrupt is to be generated numerous times, the work area for each interrupt program must be large enough to accommodate the processing executed by that program being repeated that same number of times.

A number of pointers (called "program pointers"), separately created for each of the interrupt programs indicated by the type of interrupt signal, are stored in interrupt vectors storage area 37 for interrupt vectors. The initial values for internal register 30, which are needed to run the programs corresponding to the pointers, and the head address for the work area assigned to each program are stored in interrupt value storage area 38.

Figure 8:
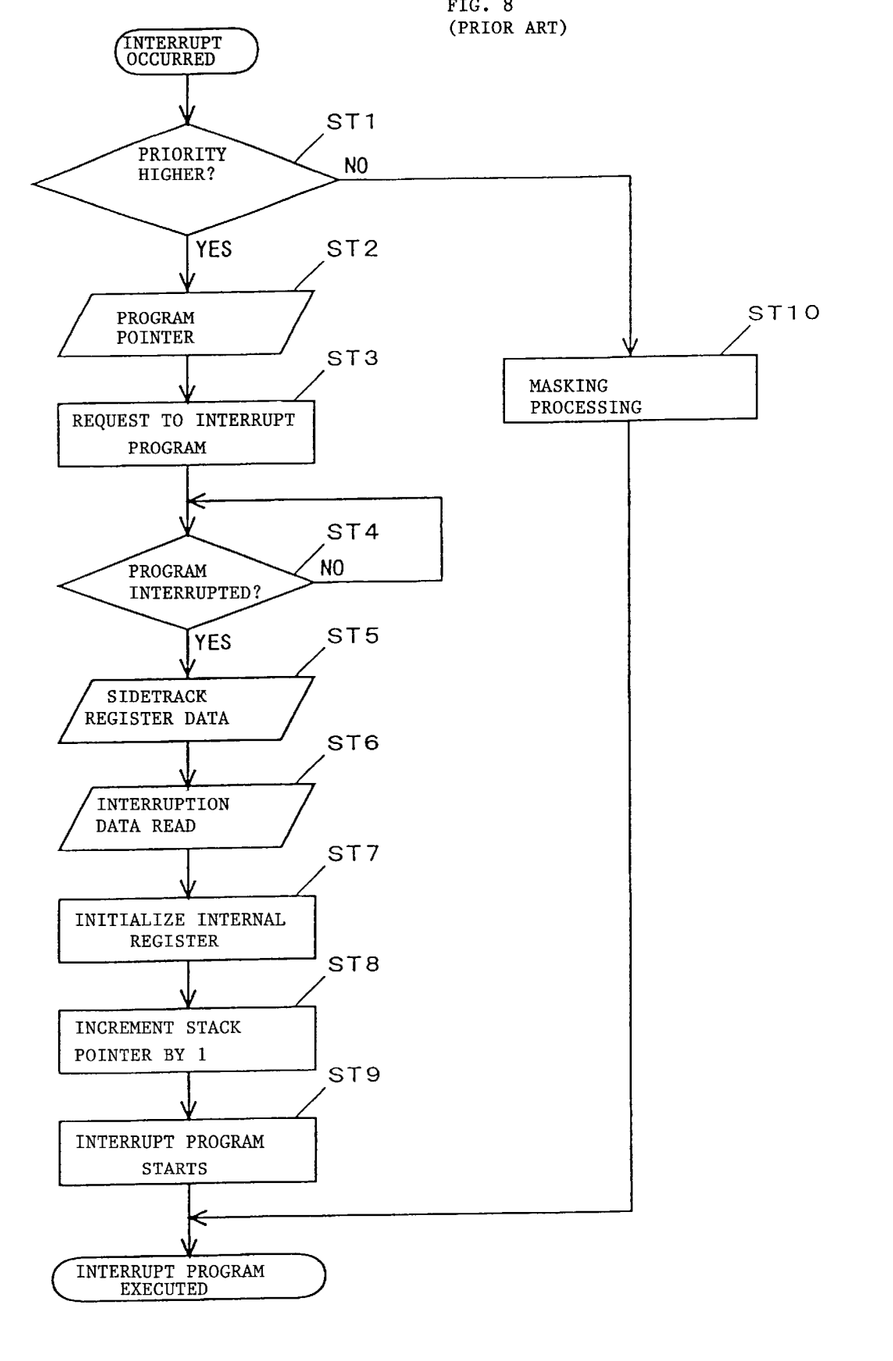
FIG. 8 shows the order of processing executed when an interrupt is generated according to the prior art.
Figure 9:
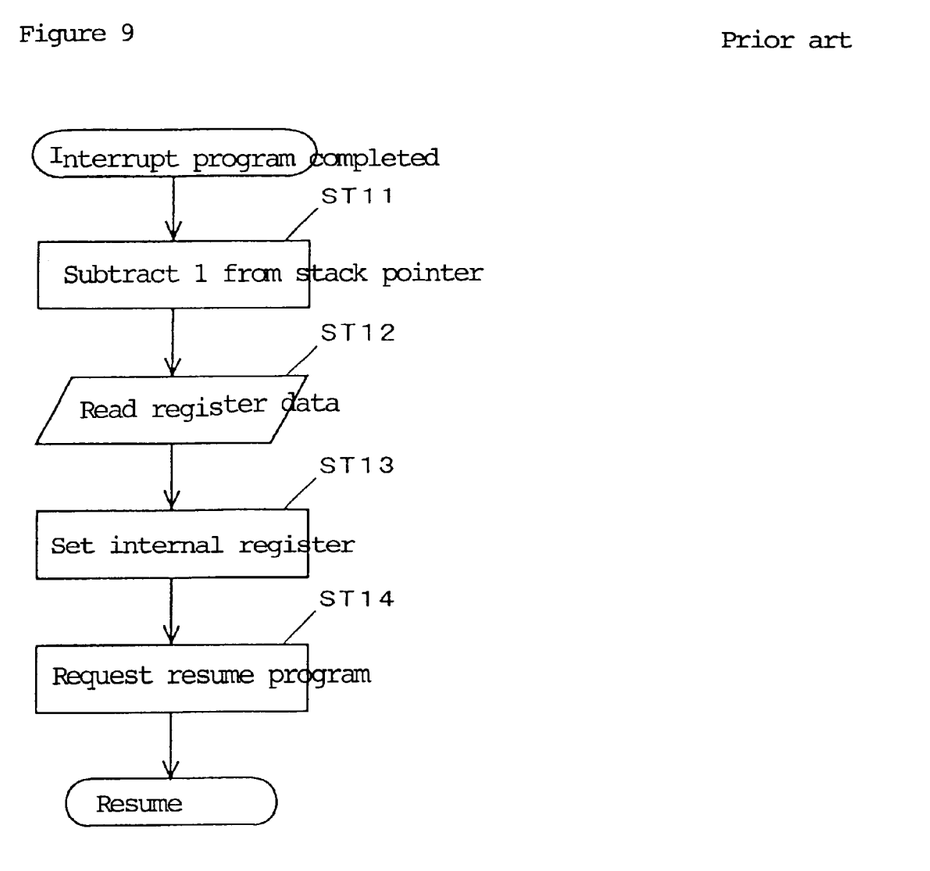
FIG. 9 shows the order of processing executed when the program to process the interrupt is concluded according to the prior art.

FIG. 8 shows the order of processing executed when an interrupt is generated. FIG. 9 shows the order of processing executed when the interrupt program has completed executing. For the sake of convenience, each step in the charts has been given a number.

We shall next explain, with reference to the flow charts, the processing executed in an operation processing device configured as shown in FIG. 6 when an interrupt is generated and when the interrupt program's processing has been completed.

When an interrupt signal is received while program executing unit 31 is in the process of executing a given program, interrupt control unit 32 checks the priority of the interrupt program associated with that signal (Step 1). If unit 32 determines that the interrupt program awaiting processing has a lower priority than the program being executed, we go to Step 10, and unit 32 executes masking processing to cause the interrupt program to wait until the current program has been completed.

If program executing unit 32 determines that the interrupt program requesting processing has a higher priority than the current program, it reads the program pointer corresponding to the aforesaid interrupt signal out of the aforesaid interrupt vector storage area 37 and sends it to sidetrack and restore data unit 33 (Step 2).

When unit 33 receives this pointer, it sends a request to interrupt the currently executing main program to the aforesaid program executing unit 31 (Step 3). Unit 31 interrupts the said executing program in response to this interrupt request, reads the current register data out of internal register 30 and sends them to sidetrack and restore data unit 33.

When unit 33 receives the register data and so is informed that the program has been interrupted, it stores the data it has just received on the stack level in storage area 36 indicated by the value of the aforesaid stack pointer (Steps 4 and 5).

Sidetrack and restore data unit 33 reads the data corresponding to the value of the aforesaid program pointer out of the aforesaid storage area 38 and sends said data to unit 31 to be executed (Step 6). Based on the data it receives, program executing unit 31 initializes internal register 30 and executes processing to switch the thread from the work area currently in use to that designated for the interrupt program (Step 7).

When these steps have been completed, sidetrack and restore data unit 33 increments the aforesaid stack pointer by 1 and sends unit 31 a request to start the interrupt program (Steps 8 and 9).

Program executing unit 31 runs the interrupt program and then sends a notification that said program has finished to sidetrack and restore data unit 33. When it receives this notification, unit 33 subtracts 1 from the stack pointers and reads out the register data from the storage area 36 for the stack level designated after one pointer has been subtracted. Unit 33 sends the said register state data to program executing unit 31 (Steps 11 and 12). Program executing unit 31 sets the said register data it received in internal register 30, thereby restoring it to the register state or status it had before the interrupt was generated (Step 13). When unit 33 outputs a request to resume the program in Step 14, it enables the aforesaid halted program that was interrupted by the interrupt program to resume running.

If a number of interrupts with high priority are generated one after the other, the procedure in Steps 1 through 9 will be executed each time an interrupt is generated. A stack pointer will be added, the register data at the time the interrupt was generated will be sidetracked, and the interrupt program's processing will be executed. When the interrupt program's processing is completed, the halted program's register data, previously sidetracked when the interrupt was generated, will be read out in order and returned to internal register 30. The program status or register state at the time of each interrupt will be restored in reverse order until at last the program status or register state that obtained before the first interrupt was generated is restored and the previous processing is resumed.

With the configuration of the prior art described above, the content stored in the thread work area 34 for the thread being executed is maintained without change, and only the register data in internal register 30 are sidetracked to allow the interrupt program's processing to be executed. The present invention does away with the separate sidetrack data storage area, separate sidetrack data storage area stack pointer thus it can use the same thread work area for thread placement and thread interrupt control. Consequently, less time is required than in previous designs to sidetrack and restore the data and the processing is speeded up.

However, the configuration of the prior art described above has the following shortcomings.

Numerous separate storage areas for sidetracked data and a work area with enough capacity to handle all the potential interrupt programs must be maintained in case interrupts are generated in series. However, it is relatively rare that all of these areas will be used. In most cases, the memory resource is wasted. Also, the need to change the value of the separate stack pointer and switch to the thread for interrupt program processing when an interrupt is generated complicates the processing.

Like work areas for ordinary threads, work areas for interrupt programs could be set up dynamically each time an interrupt is generated; this would reduce the memory capacity needed. However, this method would not eliminate the need for a work area separate from that for the ordinary program, so it could not make optimal use of the memory resource or avoid complicating the processing.

SUMMARY OF THE INVENTION

The present invention is developed in consideration of the shortcomings outlined above. The objective of this invention is to eliminate wasteful use of the memory resource, remove some of the complexity of interrupt processing and speed up the processing.

In operation processing devices based on Java (a registered trademark), the object-oriented language developed by Sun Microsystems, each time a functional program is executed, in response to a command to access that function, a work area for the program which is accessed is set up dynamically within the thread work area for the thread then being executed. To run the functional program which is accessed, the register data, which indicates the register state or status of the program being executed at the time the aforesaid function is accessed, is sidetracked and the return address needed to restore said register state to the work area for the accessed program (i.e., the frame address) is written into the work area for the aforesaid functional program. Under these conditions, the functional or interrupt program is run. When it is completed, the halted program's register data are retrieved from the aforesaid frame address and returned to the work area of the accessed program. The register data sidetracked in that area are read out and set in the internal register. In this way the processor returns to the program status or register state that existed when the aforesaid function was accessed then resumes running the original halted program.

By applying the aforesaid processing in the case of an interrupt or an external interrupt as well, this invention eliminates the need to maintain a separate memory area for interrupt processing. It simplifies the processing involved in sidetracking and restoring data and switching the program to be executed.

In the interrupt processing method related to the invention disclosed in claim 1 of this application, the work area for a currently executing program is a dynamically created memory area generated when an interrupt occurs. The register data indicating the status or register state of the program being run at that time is sidetracked into the work area for that halted program. Next, the return address (memory address) needed to return to the thread work area for the program being run when the aforesaid interrupt was generated (the halted program's thread work area) is sidetracked into the interrupt program's work area. When the interrupt program processing is completed, the return address is read out of the interrupt program's work area then the address is used to jump or return to the memory location of the halted program's work area where the halted program's register state is stored. Next, the halted program's register state is read out and reloaded back into the registers and the halted program resumes processing. Using the register data sidetracked in same work area, the processor is restored to the status or state the halted program was in at the time the aforesaid interrupt was generated.

The operation processing device related to the invention disclosed in claim 2 of this application has a read-write memory; a means to execute a program, which dynamically creates work areas in specified portions of the aforesaid memory and executes a program; and a control means, which controls the aforesaid means to execute a program when an interrupt is generated, temporarily interrupts the program being run at that time, and executes a program to run the interrupt program processing. To implement the interrupt method in claim 1, the aforesaid control means has a means to process the sidetracking of data, which, when it finds that an interrupt has been generated, sidetracks the register data indicating the status or state of the program being run when the interrupt was generated, storing the register data in the thread work area for that program, sets up a work area for the interrupt program processing in the aforesaid memory area, and sidetracks the address needed to return to the work area for the halted program, storing it in the work area for the interrupt program; and a means to process the restoring of data, which, when the interrupt program processing has been completed, returns from the aforesaid address which had been sidetracked to the work area in use when the aforesaid interrupt was generated, and, based on the register data sidetracked in that work area, restores the saved status or register state of the halted program being run when the interrupt occurred.

The aforesaid memory area is an area in a read-write memory such as a RAM which is designated for the execution of a program. If multithread processing is executed, the term includes the area set up for each thread (i.e., the thread work areas mentioned above).

The term "external interrupt" refers to interrupts generated with respect to the processor at irregular intervals by peripherals such as input-output devices. Both the inventions in claims 1 and 2 of this application require that the "external interrupt" processing have a higher priority than the program being run at the time the interrupt is generated. Only under this condition will processing be properly executed to sidetrack register data so that the program can be interrupted.

The register data indicating the status or register state of the program being run when the interrupt was generated refers to the data maintained in the processor which represent how far the program has gotten and what results it has obtained so far. Register data includes the program counter representing the address where the program is executed and the results of operations obtained by the program up to that point. The return address (memory location) needed to return to the work area for the program being run when the interrupt was generated (the halted program) is the head address of the work area for that program in the aforesaid memory area or the address of a location in that work area where some specific data are stored.

When an interrupt is generated, the register data indicating the status of the program being run at that moment are stored in the thread work area for that program (the halted program). A work area for the interrupt program's processing is set up in the part of the memory where work areas for programs can be created dynamically. The return address (memory location) needed to return to the work area for the program being run when the interrupt occurred (halted program's thread work area) is stored in the thread work area for the interrupt program. When the interrupt program's processing has been completed, the aforesaid sidetracked address is used to return to the work area for the program that was interrupted. When the register data stored in that area are returned to the processor, the program is restored to the status it was in at the moment it was interrupted and it resumes its processing.

According to this method, there is no need to designate a separate part of the memory as a holding area for sidetracked data or a work area for interrupt program's processing. The work area in use at the time of the interrupt can be maintained dynamically just as an ordinary program would be. Since the memory contains as many work areas as the number of interrupts generated, the memory resource is not wasted. Because work is performed in the part of the memory used to execute ordinary programs, it is also unnecessary to switch from the thread processing area to a special or separate thread interrupt processing area in order to do the interrupt program processing.

In an operation processing device based on a program written in Java, the processing to sidetrack and restore an interrupted program can be executed by the same method used to access an ordinary program or return to the program that requested the access.

DETAILED DESCRIPTION OF THE INVENTION

Figure 1:
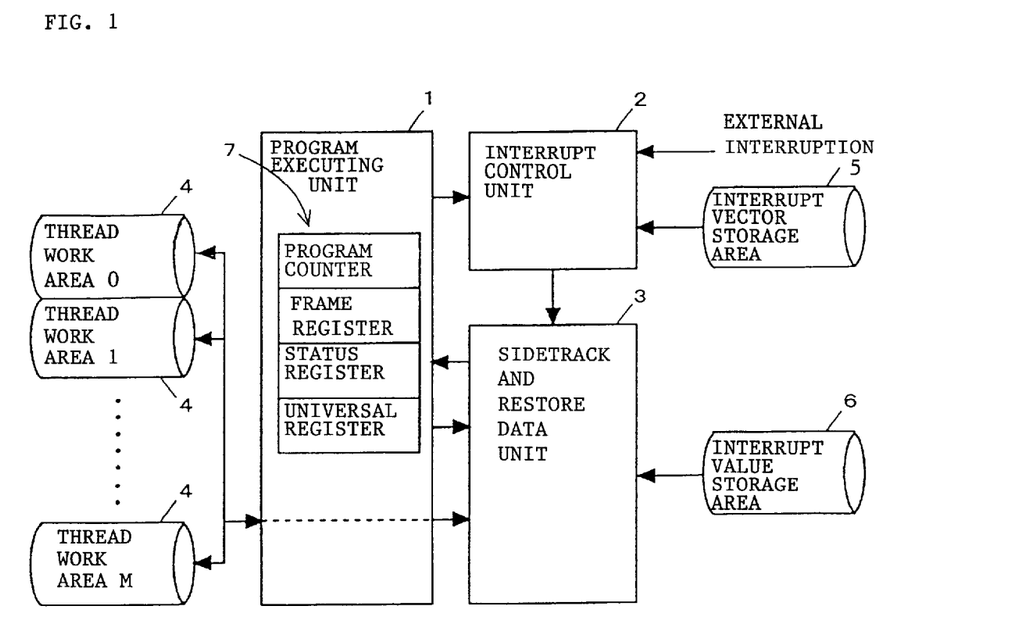
FIG. 1 shows the block diagram showing the configuration of an operation processing device according to this invention.

FIG. 1 shows the configuration of an operation processing device related to a preferred embodiment of this invention.

This operation processing device executes data processing based on a source program written in Java. In the figure, program executing unit 1 to execute a program, interrupt control unit 2 to control interrupts and sidetrack and restore data unit 3 to sidetrack and restore data are all realized by functions in a processor. The various thread work areas 4 are set up in a RAM; interrupt vector storage area 5 for interrupt vectors and interrupt value storage area 6 for interrupt values (hereafter referred to as the "storage area for settings") may be set up in a ROM or RAM.

Program execution unit 1 reads out, in order, the programs for the threads currently being executed from a program storage area which is not pictured. As it executes these programs, it reads and writes data into and out of internal register 7 and thread work areas 4. A frame register is set up in internal register 7 in which are stored a program counter, a status register, a general purpose register and the head address (i.e., the frame address) of the work area for the program being executed.

The interrupt control unit 2 and sidetracking and restoration data unit 3 of this embodiment are employed only when interrupts are generated when a program is accessed, also called the interrupt program, while an ordinary thread or program is being executed, these units execute the processing to sidetrack the register data for the halted program and to restore the sidetracked register data. Furthermore, since no storage area that is separate from the thread work area FIG. 6, item 38, is provided in this embodiment for data in internal register 7 which are sidetracked when an interrupt is generated, there is no need for a stack pointer in sidetrack and restore data unit 3, a component which was required in prior art designs.

Figure 2:
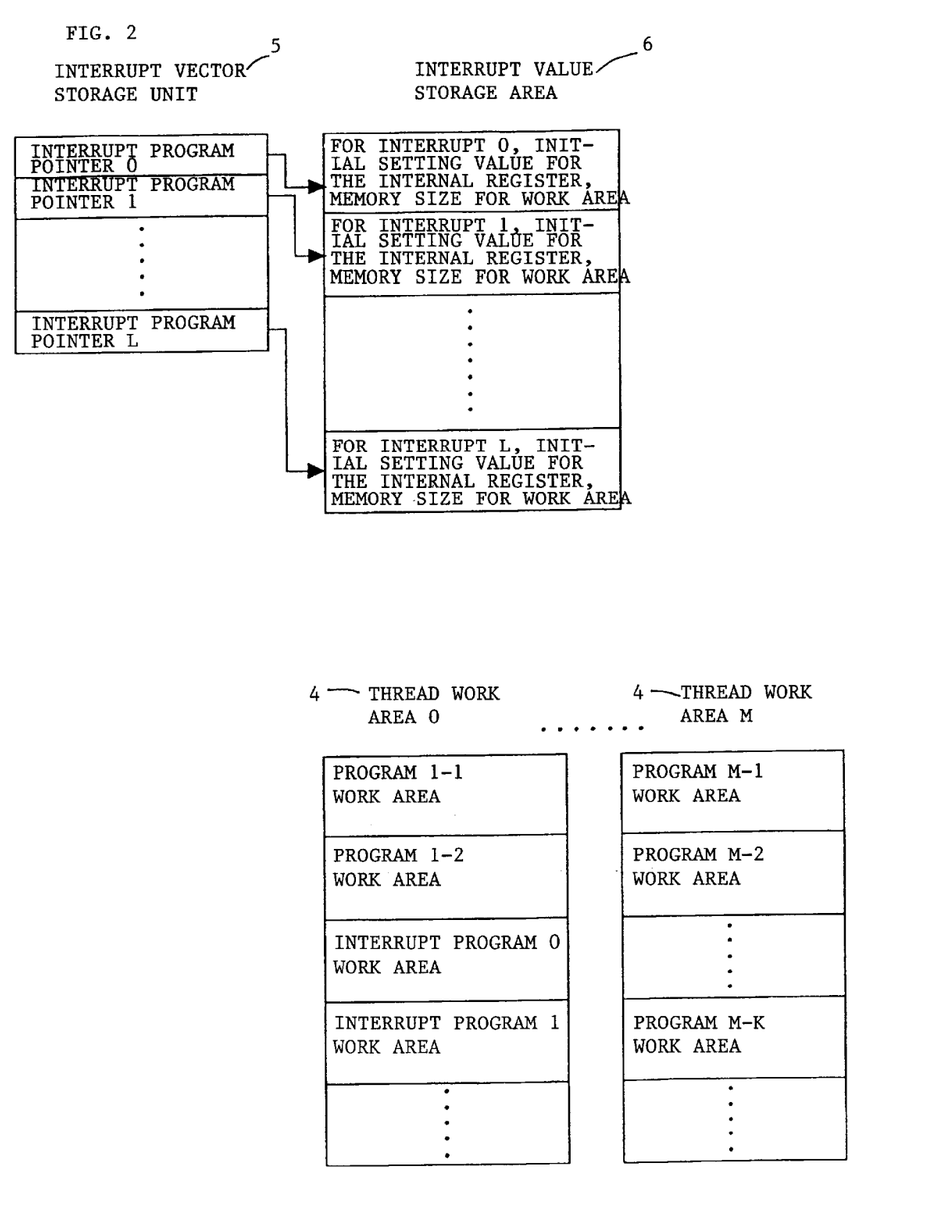
FIG. 2 shows how the data are configured in the memory of the device shown in FIG 1.

FIG. 2 shows how the data are configured in the memory of the device pictured in the aforesaid FIG. 1.

Program pointers designated for all the interrupt programs are stored in storage area 5 for interrupt vectors, just as in the prior art. The initial values for internal register 7 which are needed to execute the interrupt program for each program pointer and the size of the memory for the work area needed to execute that program are stored in storage area 6.

A thread work area 4 is set up for every thread that is activated. A separate program work area (hereafter simply referred to as a "work area") is created for each program accessed, in the order they are accessed, in the thread work area 4 for the current thread. Processing is executed in order starting from the most recent work area.

In this embodiment, when an interrupt is generated a work area for the interrupt program is also created in the thread work area 4 for the current thread.

Figure 3:
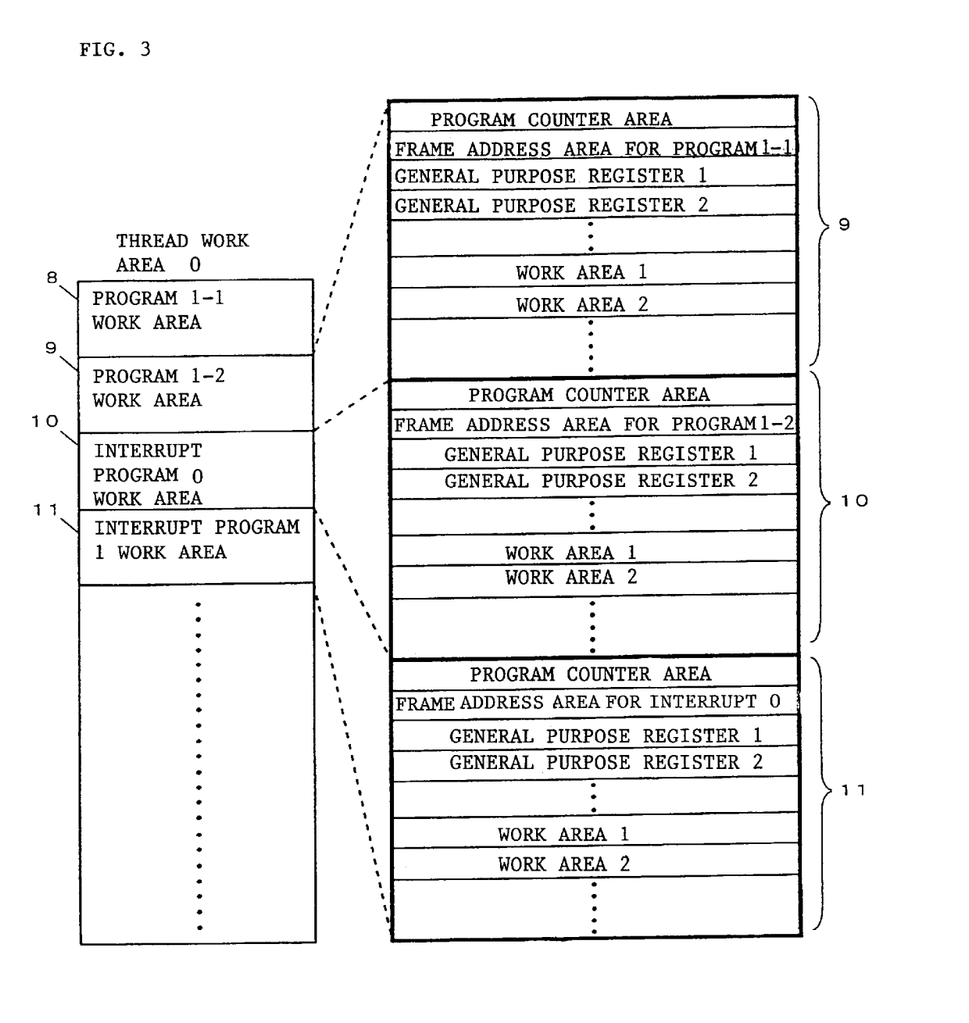
FIG. 3 shows a more detailed look at the data configuration in the work area for thread 0 shown in FIG. 1.

FIG. 3 offers a more detailed look at the data configuration in the work area for thread 0 from thread work area 4 in the aforesaid FIG. 2.

In the drawing, 8 is the work area set up for a program to execute some specific processing (hereafter referred to as "program 1-1"). 9 is the work area for a program (hereafter referred to as "program 1-2") accessed by program 1-1. 10 is the work area for the processing involved in the first interrupt (hereafter referred to as "interrupt 0"), which is generated while the aforesaid program 1-2 is running. 11 is the work area for the processing involved in the second interrupt (hereafter referred to as "interrupt 1"), which is generated while the processing related to the aforesaid interrupt 0 is being executed.

In each of work areas 8 through 11, an area is set up to maintain the program counter, the frame address and the register data in the general purpose register. The remaining area functions as a work area for the execution of the program. (A work area with this type of data configuration is called a "frame structure.")

The register values current at the moment the current or main program was interrupted, that is, the values indicating where the program is in its execution and the results of its finished operations at the moment a program to execute a function was accessed or the moment an interrupt was generated, are stored in the parts of work areas 8 through 11 where the program counter and general purpose register are maintained. The frame address for the program that was being executed one stage earlier is stored in the storage area for frame addresses.

In this embodiment, the status register in internal register 7 serves only to indicate the internal status of the processor, i.e., whether it is operating. The status register is not sidetracked when an interrupt is generated. However, if the status register contains condition codes (such as a carry) or operating modes (such as an interlock) which will affect the program, it will have to be sidetracked along with the program and the general purpose register.

Figure 4:
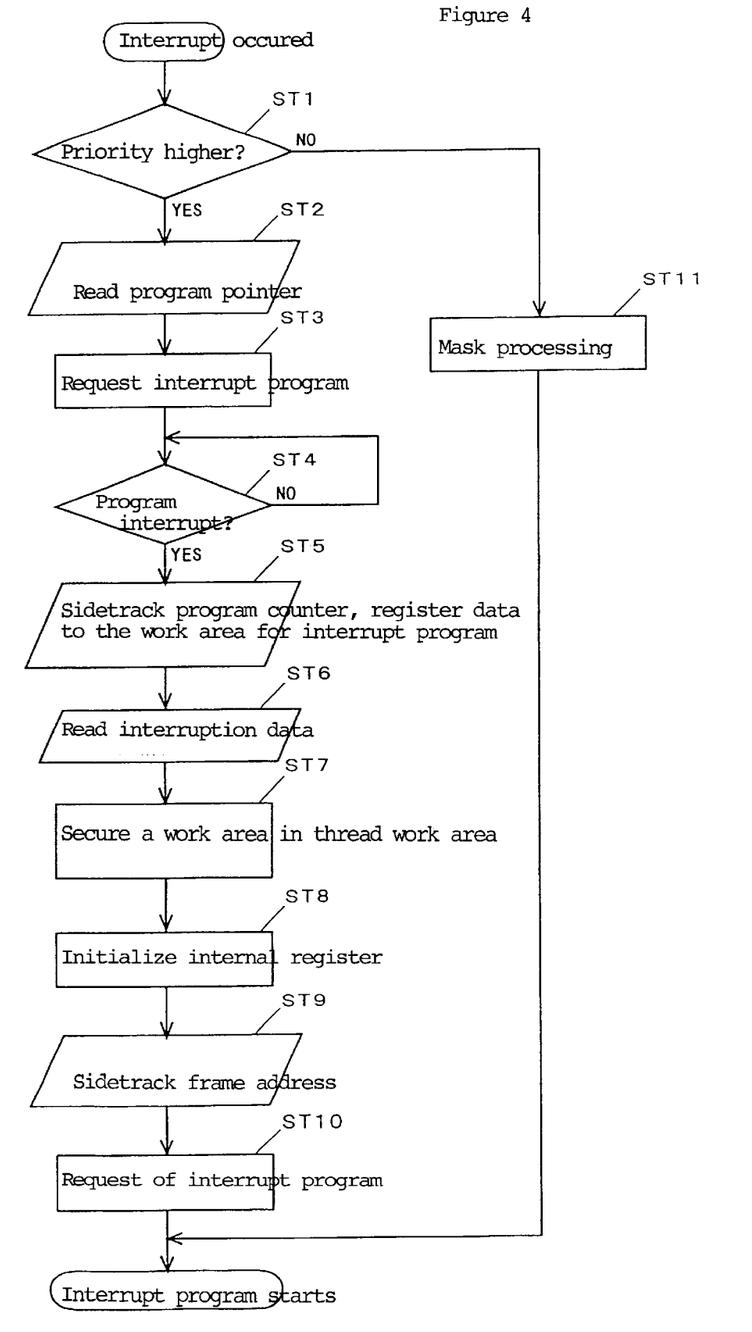
FIG. 4 shows the order of processing executed by the operation processing device from the time the interrupt is generated until the interrupt program processing begins.
Figure 5:
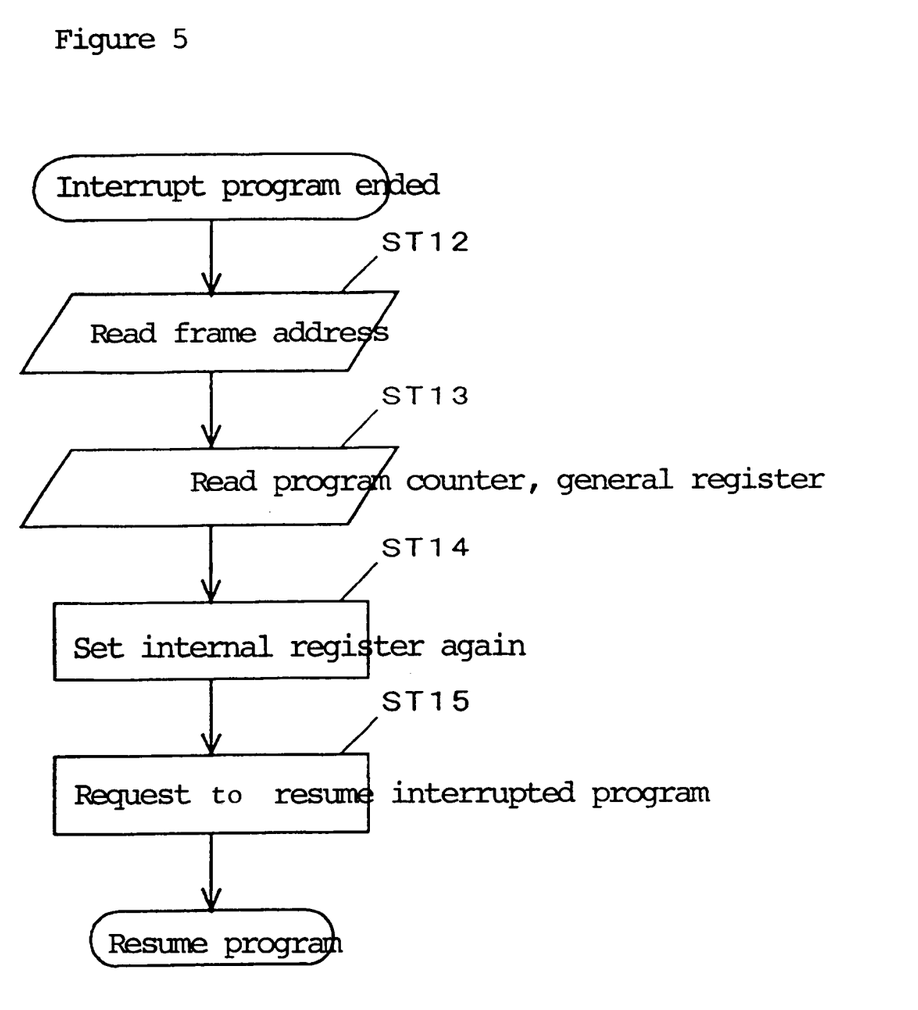
FIG. 5 shows the order of processing executed to restore the environment of the original program when the interrupt program's processing, shown in FIG. 4, has been completed.

FIG. 4 shows the order of processing executed by the aforesaid operation processing device from the time the interrupt is generated until the interrupt program's processing begins. FIG. 5 shows the order of processing executed to restore the environment of the original program when the interrupt program's processing, shown in FIG. 4, has been completed. For the sake of convenience, each step in the charts has been numbered.

In Step 1, control unit 2 responds to a given interrupt by determining whether the interrupt program's processing has a higher priority than the currently executing program. In succeeding Steps 2 through 4, using the same processing as prior art devices, the processor interrupts the program being executed by unit 1, reads the register data out of internal register 7 and sends them to unit 3. When it discovers, on receiving the register data, that the program has been interrupted, unit 3 sidetracks the program counter and the register data from the general use register in the work area for that program (the halted program) (Step 5).

Next, unit 3 reads out the data based on the pointer values read out of storage area 6 in Step 2. Based on these data, it creates a work area for the interrupt program in the work area 4 for the current thread (Step 7). It then sets the values necessary to execute the interrupt program in internal register 7 according to the aforesaid data (Step 8).

Unit 3 then creates a storage area for address data in the newly created work area for the interrupt program. It sidetracks into this area the frame address it has read out of the aforesaid internal register 7, which represents the values needed to return to the work area (memory location) for the program that was interrupted (Step 9).

When it has completed this series of tasks, unit 3 requests that execution unit 1 begin executing the interrupt program (Step 10). If it was determined in Step 1 that the interrupt processing need not be performed first, in Step 11 masking processing is executed to cause the interrupt program to stand by until the previous program is completed.

When it receives notification that the interrupt program has completed processing, unit 3 reads out the frame address (also called return address) that had been sidetracked in the work area for the interrupt program then being run, and it returns or jumps to the location of the work area for the program that had been interrupted (Step 12). Unit 3 returns to the work area for the program being run when the interrupt was generated (halted program) and reads out the program counter and general use register that had been sidetracked in the aforesaid Step 5 (Step 13).

In Step 14 the register data, read out in the aforesaid Steps 12 and 13, are sent to execution unit 1. Unit 1 sets these register data in internal register 7, thereby restoring the status of the program that was interrupted. In Step 15, the interrupted or halted program resumes execution in response to a signal representing a request from unit 3 to restart executing the halted program.

To give one example, let us consider the interrupt processing shown in FIG. 3, in which interrupt 0 is generated while program 1-2 is running. The register data for program 1-2 are read out of internal register 7 when the interrupt is generated. The program counter and general purpose register are stored in work area 9 of program 1-2. The frame address (also called return address) is stored in the newly created work area 10 for the interrupt program of interrupt 0.

In these circumstances, the values needed to execute the program being loaded that is associated to interrupt 0 are set in internal register 7, and the program is executed. When execution unit 1 notifies unit 3 that the program for interrupt 0 has been completed, unit 3 reads out the frame address (also called return address) that it sidetracked in work area 10, the work area for interrupt 0. It uses the return address, the location of program 1-2 in work area 9 at the time of the interrupt, and reads out the program counter and general purpose register that were sidetracked in area 9. When unit 1 sets the register data that it has read out in internal register 7, the status of program 1-2 at the time of the interrupt is restored, and the halted program can resume.

If a second interrupt, interrupt 1, is generated while the processing related to interrupt 0 is underway, the register data indicating the status or memory state of the program associated with interrupt 0 will be sidetracked in the same way. When the program for interrupt 1 is completed, the sidetracked register data will be read out and set in register 7. This will restore the status of the program associated with interrupt 0, which was halted when interrupt 1 was generated. The processing for the halted program corresponding to interrupt 0 will then resume.

Operation processing devices, based on a Java program, use this same method for processing within ordinary threads. If a different program (i.e., a function program) is accessed while a given program is running, the register data for the program that requested access are sidetracked using the method described above.

For example, when Program 1-2 is accessed by Program 1-1 in FIG. 3, unit 1 sends the program pointer for the requested program to sidetracking unit 3 to request that a work area be created in thread work area 4. In response, unit 3 requests that execution unit 1 read out the register data from internal register 7. When it receives this request, unit 1 stores the program counter and general purpose register that it found in the data it read out in work area 8 for program 1-1, the program that requested access (halted program). Sidetracking unit 3 creates a work area 9 in thread work area 4 for program 1-2, the program which was accessed. It stores the frame address (return address) sidetracked at the moment program 1-2 was accessed in work area 9. This frame address represents the values needed to return or jump to the thread work area 8 for program 1-1.

Based on the program pointer it receives from execution unit 1, sidetracking unit 3 reads the data for the aforesaid program 1-2 out of the data storage area. It reads out the register data needed to execute program 1-2, and sends them to execution unit 1. Unit 1 sets these register data in internal register 7 and, in response to an "execute program" request from unit 3, begins to execute program 1-2.

When program 1-2 has been completed, sidetracking unit 3 reads out the frame address (return address) that it had sidetracked in work area 9 for program 1-2 and obtains the location in work area 8 of the values for program 1-1, the program which requested access to program 1-2. Unit 3 reads out the aforesaid program counter and general use register values that it had sidetracked in work area 8 and sets these values, along with the aforesaid frame address, in internal register 7. This restores program 1-1 to the status it had at the moment it requested access to program 1-2. Sidetracking unit 3 then sends execution unit 1 a request to resume execution, and the aforesaid program 1-1 is resumed.

The operation processing device in FIG. 1 executes operation processing using a Java program. However, the invention is not limited to Java-based programs only. The same configuration can be achieved with any program written in a language which uses the same sort of memory deployment as Java.

As discussed above, with this invention the register data indicating the program status or register state, i.e., the program counter and the general use register, are sidetracked in the work area for the halted program. A work area for the interrupt program's processing is set up in the part of the memory designated as this program's work area. The address in the work area where the program was at the moment it was interrupted is sidetracked in this new work area while the interrupt program is executed. There is thus no need to set up a separate memory area for the sidetracked register data or program execution values when executing an interrupt. This allows us to use the memory resource more effectively.

Also, since this invention obviates the need to manage the location of the sidetracked register data with a stack pointer, interrupt program processing can be executed within the same thread work areas in use before the interrupt was generated. It thus eliminates the need for the complicated processing required to manage a sidetrack storage stack pointer or switch between thread and sidetrack processing. The work is performed in a memory area used for normal execution of the program, so there is no need to switch from threads processing a separate interrupt processing system, with the result that the processing is speeded up.

In an operation processing device based on a Java program, the processing to sidetrack or restore the register data uses the same method that an ordinary program employs to access another program or return from it. There is thus no need for anything other than normal processing when an interrupt is generated. The interrupt program processing is simpler and faster than in prior art devices.

While exemplary embodiments of the invention have been described and illustrated, it should be apparent that many modifications can be made to the present inventions without departing from its spirit and scope. Accordingly the invention is not limited by the foregoing description or drawings, but is only limited by the scope of the appended claims.

What is claimed is:

1. An interrupt processing method to temporarily interrupt an executing main program used in an operation processing device by setting a work area dynamically in a memory, comprising the steps of:

sidetracking register data into a work area provided for said executing main program being run at the time of an interruption, said register data indicating the register state of said executing main program being run at the time of said interruption, said work area being dynamically created in said work area for said executing main program;

sidetracking in said work area of said interrupted program a return address needed to resume execution of said main program being run at the interruption;

returning to an original work area of said main program, which was running before the interruption occurred, referring said sidetracked return address when the interrupt program processing is over, and restoring the original register state of said main program being run at the time the interruption using said sidetracked register data.

2. An operation processing device provided with an interruption function, comprising:

a read-write memory;

a program executing means to execute a main program, which dynamically creates a work area in specified portion of said memory and executes said main program; and a control means to control said program executing means when an interrupt is generated, which interrupts said main program temporarily and executes an interruption program;

wherein said control means comprises:

a sidetracking means to sidetrack register data into a work area provided for said executing main program being run at the time of an interruption, in which said register data indicates the register state of said main executing program being run at the time of an interruption, said work area is dynamically created in said work area for said main executing program and a return address needed to return to said main program being run at the interruption is sidetracked into said work area of said interrupted program; and a restoring means to return to an original thread work area of said main program, which was running before the interruption occurred, referring said sidetracked return address when the interrupt program processing is over, and to restore the original register state of said main program being run at the time the interruption using said sidetracked register data.

* * * * *